United States Patent
Patti et al.

[11] Patent Number: 5,853,228
[45] Date of Patent: Dec. 29, 1998

[54] WHEEL COVER RETAINER DEVICE

[76] Inventors: Tony Patti, 13920 Mt. McClellan Blvd. #B, Stead; Charles S. Lowther, 9494 Spearhead Way, Reno, both of Nev. 89506

[21] Appl. No.: 844,403

[22] Filed: Apr. 18, 1997

[51] Int. Cl.⁶ ..................................................... B60B 7/14
[52] U.S. Cl. ..................................... 301/37.37; 301/108.4
[58] Field of Search ............................... 301/37.1, 37.21, 301/37.31, 37.32, 37.37, 108.1, 108.4

[56] References Cited

U.S. PATENT DOCUMENTS

| | | |
|---|---|---|
| 4,606,582 | 8/1986 | Warren . |
| 4,925,249 | 5/1990 | Auspelmyer . |
| 5,031,965 | 7/1991 | Buerger . |
| 5,443,582 | 8/1995 | Ching ................................. 301/37.37 |
| 5,542,750 | 8/1996 | FitzGerald ......................... 301/37.37 |
| 5,645,324 | 7/1997 | Wright et al. ...................... 301/37.37 |
| 5,695,257 | 12/1997 | Wright et al. ...................... 301/37.37 |

FOREIGN PATENT DOCUMENTS

| | | |
|---|---|---|
| 4-85102(A) | 3/1992 | Japan . |
| 2 224 702 | 5/1990 | United Kingdom . |

*Primary Examiner*—Russell D. Stormer
*Attorney, Agent, or Firm*—Ian F. Burns

[57] ABSTRACT

A wheel cover retainer device is disclosed which utilizes a retainer ring for attaching a wheel cover to the wheel rim of a vehicle. The retainer ring is attached to the vehicle wheel rim by holes which receive the lug nuts or studs of the vehicle wheel. Two anti-rotation locks are provided which prevent the retainer ring from rotating off of the wheel rim and otherwise fasten the retainer ring to the wheel rim. The first anti-rotation lock has a substantially inverted V-shaped portion for producing an outward spring force. The ends of the V-shaped portion may have an edge surface and a crescent for engaging the retainer ring and lug nut, respectively. The second anti-rotation lock comprises a substantially planar portion with a hole for engaging a stud and a hook for engaging a neighboring hole on the retainer ring.

20 Claims, 3 Drawing Sheets

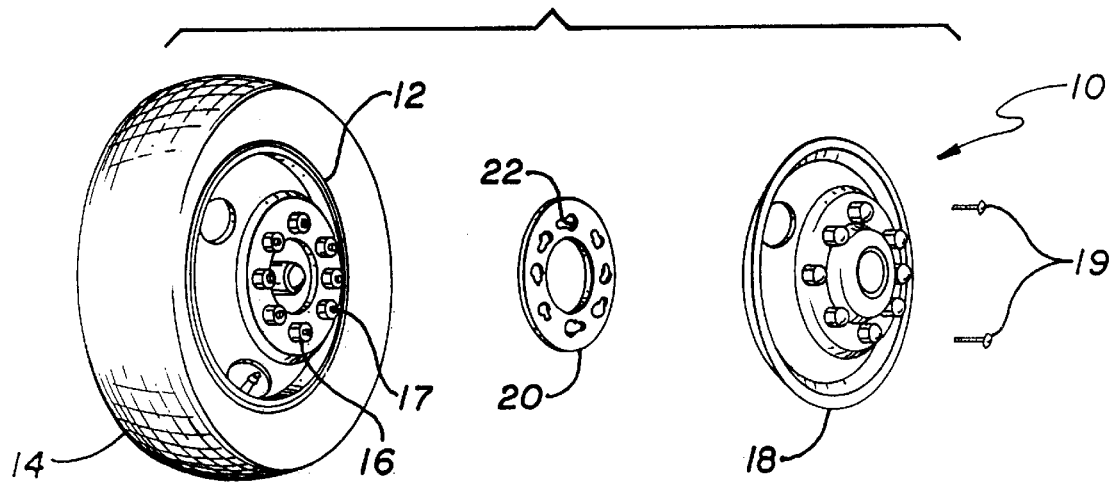
FIG. 1
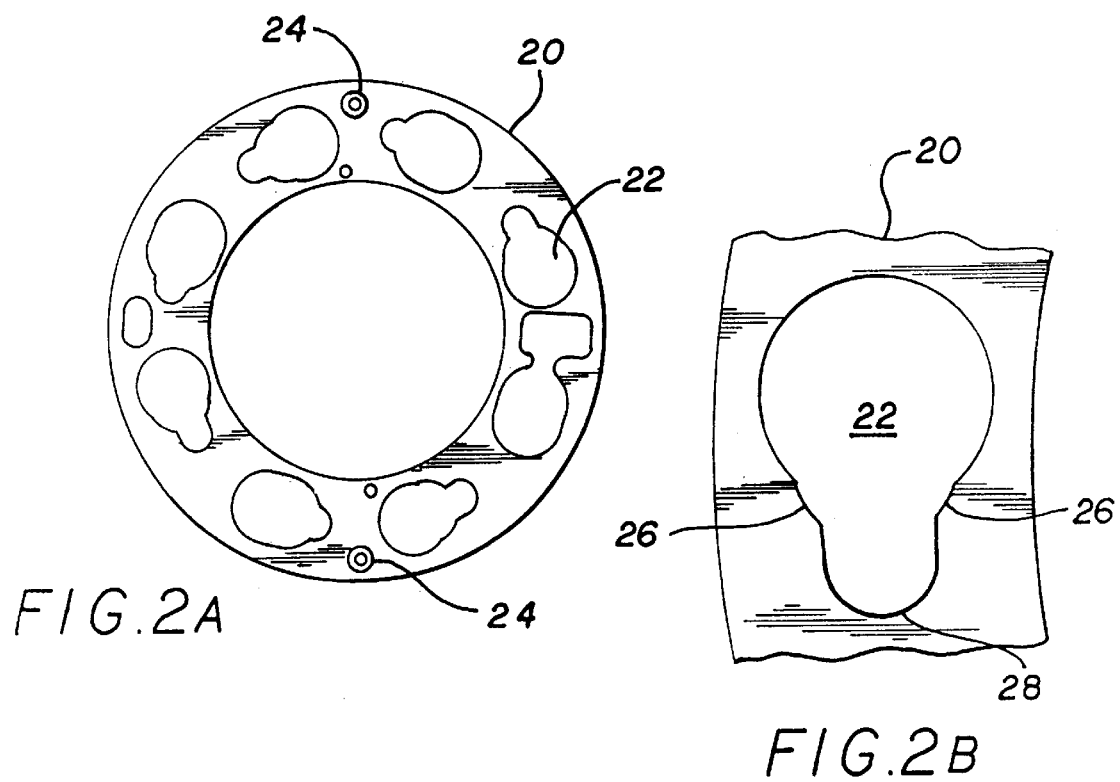
FIG. 2A
FIG. 2B

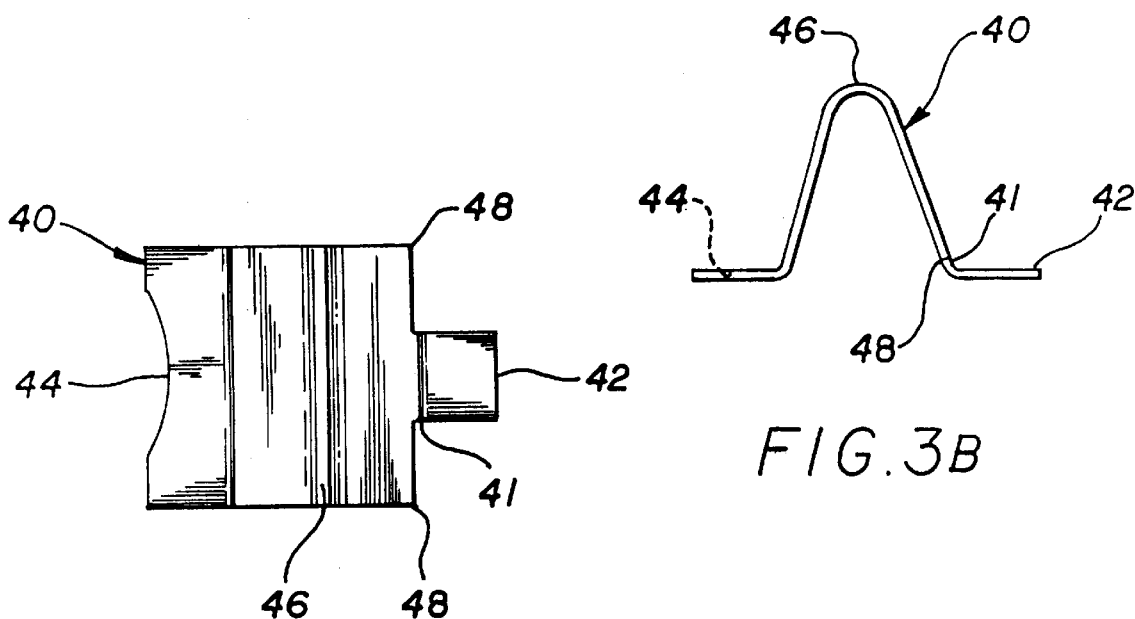
FIG. 3A
FIG. 3B
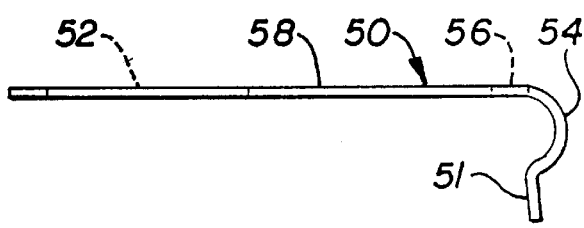
FIG. 4B
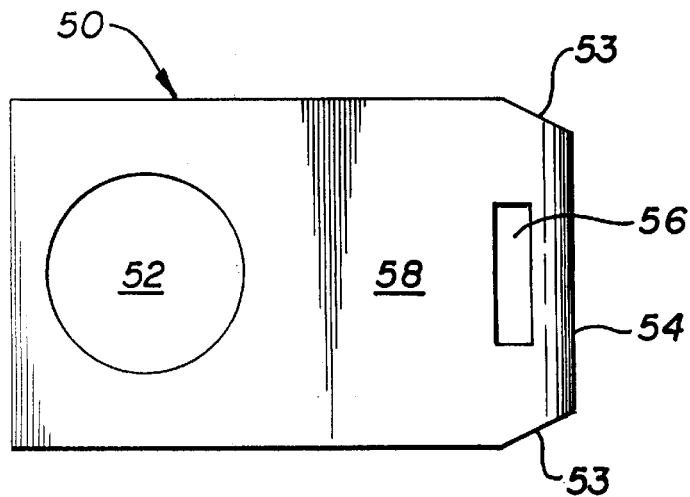
FIG. 4A

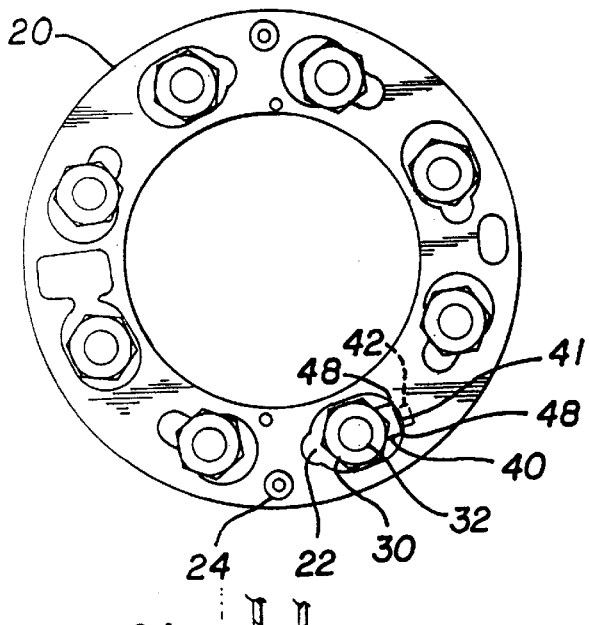
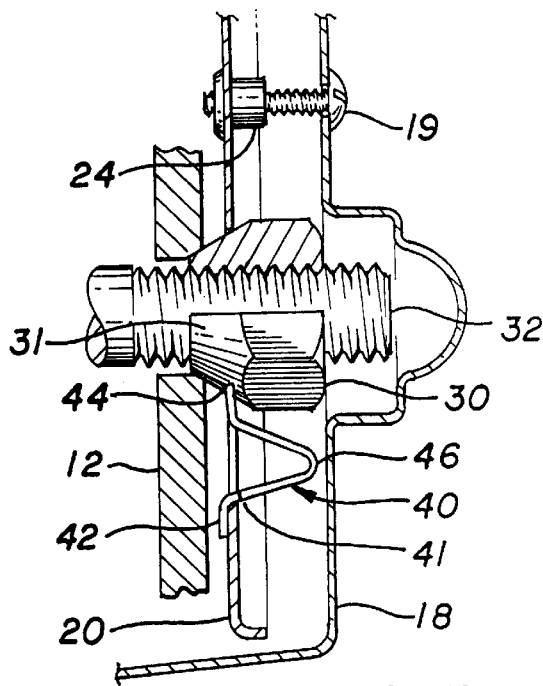
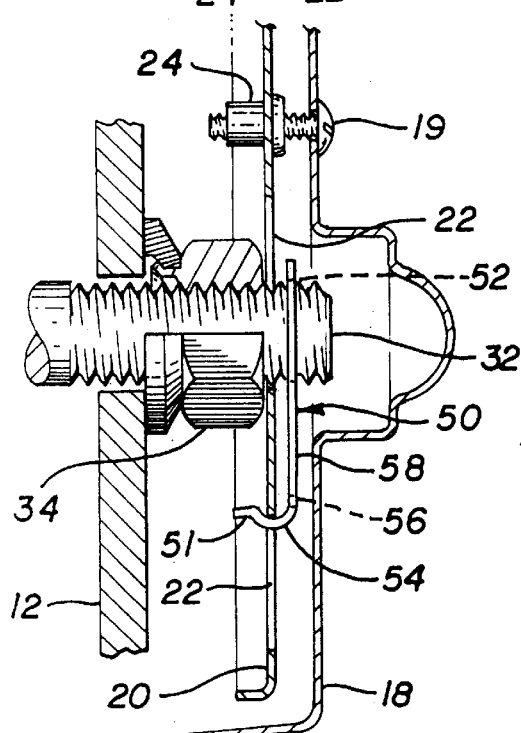
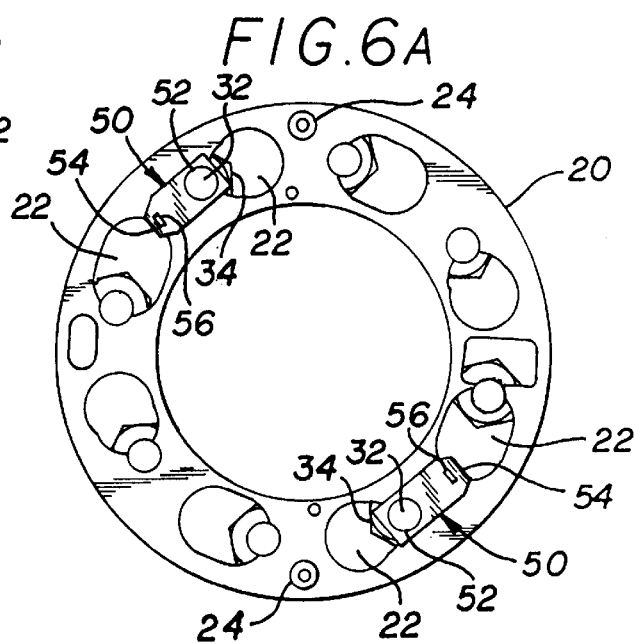

WHEEL COVER RETAINER DEVICE

BACKGROUND OF THE INVENTION

1. Field of Invention

The present invention relates to a device for holding a wheel cover on the wheel of a vehicle using a retainer ring and anti-rotation locks.

2. Description of Related Art

Decorative wheel covers for improving the appearance of vehicles are well known in the art. U.S. Pat. No. 5,167,440, issued to Fitzgerald, discloses an advanced wheel cover assembly which utilizes a retainer ring to attach the wheel cover to the vehicle wheel. The retainer ring has a number of holes which allow it to be placed over the lug nuts or studs of the wheel. Once placed over the nuts or studs, the retainer ring is rotated to abut or engage the nuts or studs. Cam locks are attached to the retainer ring and used to prevent the ring from rotating and disengaging the nuts or studs.

Although this invention is far superior to its prior art, improvements have been developed to reduce the cost of the device. The device disclosed in Fitzgerald requires several processes to manufacture the cam locks. The cam locks must be punched from sheet metal or other suitable material and bent into a relatively intricate shape. After the locks have been formed, they must be pivotably attached to the retainer ring.

If practical, it is always desirable to reduce the number of steps in the manufacturing process. These steps require time and labor which increases the cost of the product. Therefore, it is desirable to reduce the number of steps required to produce the locking mechanism of the retainer device.

SUMMARY OF INVENTION

1. Objects of the Invention

In view of the above discussion, it is an object of the present invention to provide a wheel cover retaining device which is less expensive to manufacture.

It is another object of the present invention to provide a wheel cover retaining device which is easily installed.

It is another object of the present invention to provide a wheel cover retainer device which may be used on a variety of wheel and lug nut designs.

It is still another object of the present invention to provide a wheel cover retainer device which utilizes simple anti-rotation locks for holding a retainer ring on the wheel of a vehicle.

These and other objects of the present invention may be realized by reference to other portions of the specification, claims, and abstract.

2. Brief Description of the Invention

In accordance with the above objectives, the present invention comprises a retainer ring which is adapted to be attached to the lug nuts or studs of a vehicle wheel. The retainer ring, once attached, holds a wheel cover to the wheel of the vehicle. The retainer ring comprises a plurality of holes for receiving either the lug nuts or the studs of the vehicle wheel. If conical lug nuts are used on the vehicle wheel, the lug nuts are inserted through the holes of the retainer ring, and the retainer ring is rotated so that sides or edges of the holes abut or engage the conical undersurface of the lug nut. If swivel lug nuts are used on the vehicle wheel, the studs of the wheel are inserted through the holes of the retainer ring, and the retainer ring is rotated so that a side or edge of the hole abuts or engages the studs.

Two different locking devices are provided for preventing the retainer ring from rotating and disengaging the lug nuts or studs. The first anti-rotation lock comprises a spring portion which is substantially an inverted V-shape. An edge surface is provided at one end of the spring portion for abutting the edge of a hole on the retainer. A tab may also be provided at this end for abutting the undersurface of the retainer ring and preventing the edge surface from disengaging the edge of the hole. Corners may also be provided at this end of the spring portion for abutting the upper surfaces of the retainer ring and preventing disengagement.

The opposite end of the spring portion may have a nut surface for abutting the conical undersurface of the lug nut. The nut surface may be substantially crescent-shaped. This anti-rotation lock may be installed by compressing the spring member, engaging the edge surface with the edge of a hole, and inserting the nut surface under the conical lug nut. It may be removed by compressing the spring portion and prying the nut surface out from under the lug nut.

The second anti-rotation lock comprises a structural portion with a hole for receiving a stud of the vehicle wheel. A hook member is attached to the structural portion for engaging an adjacent hole on the retainer ring. The hook member may have a flared end for assisting the insertion of the hook into the hole. The lock is installed by engaging a stud with the hole in the structural portion and pushing down on the hook portion until it engages the edge of an adjacent hole. This second anti-rotation lock may be removed by inserting a screw driver into a slot provided near the hook portion of the lock and prying the hook portion out of the retainer ring.

Once the retainer ring and anti-rotation locks have been installed, the wheel cover may then be attached to the retainer ring by screws which engage rivnuts located on the retainer ring. Other attachment means may also be used, such as bolts, locking pins, nuts, and clamps.

The above description sets forth, rather broadly, the more important features of the present invention so that the detailed description of the preferred embodiment which follows may be better understood and that contributions of the present invention to the art may be better appreciated. There are, of course, additional features of the invention that will be described hereinafter and which will form the subject matter of claims appended hereto. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 1 is an exploded perspective view of a typical wheel cover assembly which may use a retainer ring like that of the present invention.

FIG. 2A is a front elevational view of a retainer ring of the present invention.

FIG. 2B is an outline of a retainer ring hole of the retainer ring of the present invention.

FIG. 3A is a top plan view of an anti-rotation lock of the present invention for use with conical lug nuts.

FIG. 3B is a side elevational view of the anti-rotation lock of FIG. 3A.

FIG. 4A is a top plan view of an anti-rotation lock of the present invention for use with swivel lug nuts.

FIG. 4B is a side elevational view of the anti-rotation lock of FIG. 4A.

FIG. 5A is a front elevational view of a retainer ring engaged with a wheel rim which uses conical lug nuts and an anti-rotation lock engaging the retainer ring and a nut.

FIG. 5B is a partial cross-sectional side view of the taken along line 5B—5B of FIG. 5A with a wheel cover installed.

FIG. 6A is a front elevational view of a retainer ring engaged with a wheel rim which uses swivel lug nuts and anti-rotation locks engaging the retainer ring and studs.

FIG. 6B is a partial cross-sectional side view taken along line 6B—6B of FIG. 6A with a wheel cover installed.

DESCRIPTION OF THE PREFERRED EMBODIMENT

As seen in FIG. 1, a typical wheel cover assembly 10, which may use the retainer device of the present invention, comprises a wheel rim 12 for holding and supporting a tire 14. Wheel rim 12 is attached to the axle of the vehicle by lug nuts 16 and studs 17 may protrude outwards past lug nuts 16. A wheel cover 18 is attached to wheel rim 12 by a retainer ring 20. Retainer ring 20 has a plurality of holes 22 for receiving lug nuts 16 or studs 17. Screws 19 may be used to attach wheel cover 18 to retainer ring 20. However, it is recognized that many other fastening devices may be used to attach wheel cover 18 to retainer ring 20.

As seen in FIG. 2A, retainer ring 20 has a plurality of holes 22 for receiving lug nuts 16 or studs 17 and attaching retainer ring 20 to wheel rim 12. Rivnuts 24 may be provided on retainer ring 20 for receiving screws 19 and attaching wheel cover 18 to the retainer ring. Alternatively, nuts, bolts, screw receptacles, or other fastening means may be provided in place of rivnuts 24.

As seen in FIG. 2B, retainer ring 20 is designed to be used with a variety of wheel rims and lug nuts. Once the lug nuts or studs are inserted into holes 22, retainer ring 20 is rotated so that the lug nuts or studs are seated against the edges or sides of holes 22. The most commonly used lug nuts include conical lug nuts and swivel lug nuts. If retainer ring 20 is used with conical lug nuts, the nuts are seated on seats 26. If swivel lug nuts are used, the studs of the wheel are seated on seats 28.

FIGS. 3A and 3B disclose an anti-rotation lock 40 of the present invention which may be used with conical lug nuts. Lock 40 comprises an edge surface 41, a tab 42, nut surface 44, spring portion 46, and corners 48. Edge surface 41 abuts the edge of retainer ring hole 22. Tab 42 is adapted to be inserted underneath retainer ring 20 while corners 48 rest on top of the retainer ring. Nut surface 44 may be substantially crescent-shaped and is adapted to abut undersurface 31 of conical lug nut 30 (see FIG. 5B). Spring portion 46 provides an outward spring force between the conical lug nut and the edge of retainer ring hole 22.

As seen in FIGS. 4A and 4B, the present invention also comprises an anti-rotation lock 50 which is adapted to be used with swivel lug nuts. Lock 50 comprises a structural portion 58 with a hole 52 for receiving a stud 32 of a vehicle wheel (see FIG. 6B). A hook portion 54 is provided for engaging an adjacent hole 22. An end 51 of hook portion 54 may be flared to assist the insertion of the hook portion into a hole. Lock 50 also includes slot 56 for receiving a screwdriver or other similarly shaped instrument for prying up hook 54 when it is engaged with a hole. Lock 50 may include tapered portions 53 so that hook 54 is narrow enough to be inserted into hole 22.

One of the many advantages of the present invention is that anti-rotation locks 40 and 50 may be inexpensively manufactured. Both of these locks may be punched from a ribbon of metal, preferably stainless steel, and bent into its desired shape. Unlike cam locks used in the Fitzgerald patent, anti-rotation locks 40 and 50 may be produced in a single stamping process. In addition, it is not necessary to attach anti-rotation locks 40 and 50 to the retainer ring as is required with cam locks. It is recognized that other materials and manufacturing processes may also be used and the object of the present invention may still be achieved. For example, locks 40 and 50 may be made of plastic, fiber composite, and any kind of metal.

As seen in FIGS. 5A and 5B, a wheel using conical lug nuts is engaged by inserting the lug nuts through holes 22 of retainer ring 20. The retainer ring is then rotated in a counterclockwise direction to seat conical lug nut undersurface 31 on seats 26 (see FIG. 2B) of retainer ring holes 22. Once the retainer ring has been properly positioned, tab 42 of anti-rotation lock 40 is inserted beneath retainer ring 20. Corners 48 rest on top of retainer ring 20. Using a screwdriver, spring portion 46 is compressed and nut surface 44 is inserted beneath conical lug nut 30 to abut undersurface 31. In this way, retainer ring 20 is firmly held by edge surface 41 and lug nut 30. Wheel cover 18 substantially covers and encloses retainer ring 20, lug nut 30, and stud 32. Screw 19 attaches wheel cover 18 to retainer ring 20 by rivnut 24.

As seen in FIGS. 6A and 6B, a wheel which uses swivel lug nuts is engaged by inserting stud 32 through hole 22 of retainer ring 20. The retainer ring is then rotated clockwise to seat stud 32 on seats 28 (see FIG. 2B) of holes 22. Stud 32 is then inserted into hole 52 of anti-rotation lock 50. Lock 50 is then pushed inward until hook 54 engages an adjacent hole 22. In this way, lock 50 holds retainer ring 22 firmly against stud 32 and retainer ring 22 is prevented from rotating. In the preferred embodiment, two locks 50 are used on one retainer ring and they are positioned on opposite sides of the retainer ring. Wheel cover 18 substantially covers and encloses retainer ring 20, stud 32, and swivel nut 34. Screw 19 attaches wheel cover 18 to retainer ring 20 by rivnut 24.

It is recognized that locks 40 and 50 may take different shapes and still achieve the objects of the present invention. For example, spring portion 46 may be semi-circular or have a plurality of curved sections. Similarly structural portion 58 may have curved portions and hook portion 54 may be removed and other fasten means may be used, such as a hole and screw.

SUMMARY

It may now be realized from the above description that the present invention provides a means for securing a wheel cover to wheel rims which use a variety of lug nuts. The present invention is adapted to use two different anti-rotation locks to prevent retainer rings from rotating off of a wheel rim. The first anti-rotation lock comprises an inverted V-shaped spring with a crescent and tab attached to the opposite ends of the spring portion. The second anti-rotation lock comprises a hole for receiving a stud and a hook member for engaging an adjacent hole. It may be seen that this combination of elements provides a superior method for locking a retainer ring to a vehicle wheel rim. The present invention is inexpensive to manufacture, reliable, durable, and is easily installed and removed by untrained users.

Although the description above contains many specifications, these should not be construed as limiting the scope of the invention but as merely providing illustrations of some of presently preferred embodiments of this invention. For example, spring portion 46 of lock 40 may take different shapes and still achieve the objects of the present invention. Similarly, structural portion 58 of lock 50 may be fashioned in different shapes and still obtain the functionality of the present invention. Thus, the scope of the invention should be determined by the appended claims and their legal equivalents rather than by the examples given.

What is claimed is:

1. A lock for securing a wheel cover retainer ring to a wheel, the retainer ring having at least one hole defined by an edge for receiving a lug nut, the anti-rotation lock comprising:
    (A) a spring portion with a first and second end for producing an outward force,
    (B) an edge surface on said first end of said spring portion for abutting the edge of the hole, and
    (C) a nut surface on said second end of said spring portion for abutting the lug nut,
   whereby the lock may be inserted between the lug nut and the edge to lock the retainer ring on the wheel.

2. The lock of claim 1 wherein said spring portion is substantially V-shaped.

3. The lock of claim 1 wherein the retainer ring has an upper and lower surface, the lock further comprising a tab on said first end for abutting the lower surface.

4. The lock of claim 3 further comprising corners on said first end for abutting the upper surface, whereby the ring is held between said tab and said corners.

5. The lock of claim 1 wherein said nut surface is substantially crescent-shaped.

6. The lock of claim 1 wherein the lock is formed by stamping.

7. An lock for securing a wheel cover retainer ring to a wheel, the wheel having at least one stud, the retainer ring having at least one hole, the lock comprising:
    (A) a structural portion for providing structural support,
    (B) a hole in said structural portion for receiving a stud, and
    (C) a hook portion attached to said structural portion for engaging the hole of the retainer ring,
   whereby said hole may receive the stud and said hook portion may engage the hole of the retainer ring.

8. The lock of claim 1 wherein said hook portion comprises a flared end for assisting the insertion of said hook portion into the hole.

9. The lock of claim 1 further comprising a slot on said structural portion for prying said hook portion out of the hole.

10. The lock of claim 1 wherein said structural portion and said hook portion are integrally formed.

11. The lock of claim 10 wherein the lock is formed by stamping.

12. The lock of claim 10 wherein the lock is formed of stainless steel.

13. An apparatus for attaching a wheel cover to a vehicle wheel, the wheel having at least one lug nut, the apparatus comprising:
    (A) a retainer ring for attaching to the lug nut, said retainer ring having at least one hole defined by an edge for receiving the lug nut,
    (B) at least one lock for attaching said retainer ring to said lug nut, said lock comprising:
        (a) a spring portion with a first and second end for producing an outward force,
        (b) an edge surface on said first end of said spring portion for abutting said edge of said hole of said retainer ring, and
        (c) a nut surface on said second end of said spring portion for abutting the lug nut of the wheel, and
    (C) a wheel cover for covering the wheel, said wheel cover being releasably attachable to said retainer ring.

14. The apparatus of claim 13 wherein said spring portion is substantially V-shaped.

15. The apparatus of claim 13 wherein said retainer ring has a lower surface, said lock further comprising a tab on said first end for abutting said lower surface.

16. The apparatus of claim 13 wherein said retainer ring has an upper surface, said lock further comprises corners for abutting said upper surface.

17. The apparatus of claim 13 wherein said nut surface is substantially crescent-shaped.

18. An apparatus for attaching a wheel cover to a vehicle wheel, the wheel having at least one stud, the apparatus comprising:
    (A) a retainer ring for attaching to the stud, said retainer ring having at least one hole,
    (B) at least one lock for securing said retainer ring to the stud, said lock comprising:
        (a) a structural portion for providing structural support,
        (b) a hole in said structural portion for receiving the stud of the wheel, and
        (c) a hook portion attached to said structural portion for engaging said hole of said retainer ring, and
    (C) a wheel cover for covering the wheel, said wheel cover being releasably attachable to said retainer ring.

19. The apparatus of claim 18 wherein said lock further comprises a slot on said structural portion for prying said hook portion out of said hole.

20. The apparatus of claim 18 wherein said lock comprises at least one tapered portion for assisting the insertion of said hook portion into said hole.

* * * * *